United States Patent
Andrew et al.

(10) Patent No.: US 12,067,660 B2
(45) Date of Patent: Aug. 20, 2024

(54) PERSONALIZED AVATAR FOR MOVEMENT ANALYSIS AND COACHING

(71) Applicant: RLT IP LTD., Gosport (GB)

(72) Inventors: Leslie Andrew, Newport (GB); David M. Jessop, New Alresford (GB); Peter Robins, Woolton Hill (GB); Ferenc Visztra, East Cowes (GB); Jonathan M. Dalzell, Lee-on-the-Solent (GB)

(73) Assignee: RLT IP LTD., Gosport (GB)

( * ) Notice: Subject to any disclaimer, the term of this patent is extended or adjusted under 35 U.S.C. 154(b) by 25 days.

(21) Appl. No.: 17/623,187

(22) PCT Filed: Jun. 28, 2019

(86) PCT No.: PCT/EP2019/067480
§ 371 (c)(1),
(2) Date: Dec. 27, 2021

(87) PCT Pub. No.: WO2020/259855
PCT Pub. Date: Dec. 30, 2020

(65) Prior Publication Data
US 2022/0165012 A1    May 26, 2022

(51) Int. Cl.
*G06T 13/40*     (2011.01)
*G06T 17/20*     (2006.01)
(Continued)

(52) U.S. Cl.
CPC ............. *G06T 13/40* (2013.01); *G06T 17/20* (2013.01); *G06T 19/20* (2013.01); *G06V 40/10* (2022.01); *G06T 2219/2016* (2013.01)

(58) Field of Classification Search
None
See application file for complete search history.

(56) References Cited

U.S. PATENT DOCUMENTS 8,013,852 B2    9/2011  Ng-Thow-Hing et al.
10,568,580 B2 *  2/2020  Morger ............... A61B 5/0033
(Continued)

FOREIGN PATENT DOCUMENTS

WO          2008023250 A1    2/2008
WO     WO-2018146546 A1 *   8/2018  .............. G06F 3/011

OTHER PUBLICATIONS

Herda, L. et al., "Skeleton-based motion capture for robust reconstruction of human motion", Computer Animation 2000 Proceedings, Piscataway, New Jersey (May 3, 2000) pp. 77-83, XP010526533, ISBN: 978-0-7695-0683-8.

*Primary Examiner* — Sultana M Zalalee
(74) *Attorney, Agent, or Firm* — David T. Millers

(57) ABSTRACT

An avatar personalized for a subject and used in movement analysis and coaching uses a 3D polygon mesh representation of a human, authored for one human skeleton model, with a different size (scaled) skeleton model, without producing visual artifacts. Dimensions of the scaled skeleton model can be determined from three or eight measurements of a subject or from scanning or photographic methods. The avatar animated based on motion capture data may be animated alone or with one or more other avatars that are synchronized spatially, orientationally, and/or at multiple times to allow a user to easily compare differences between performances. An information presentation in an animation may use pixel energies from multiple animation frames to ensure that the information remains relatively stationary and does not obstruct important visual details.

7 Claims, 5 Drawing Sheets

(51) Int. Cl.
    *G06T 19/20*     (2011.01)
    *G06V 40/10*     (2022.01)

(56) References Cited

U.S. PATENT DOCUMENTS

| | | | | |
|---|---|---|---|---|
| 2004/0059242 | A1* | 3/2004 | Masuo | A61B 5/6826 |
| | | | | 600/547 |
| 2007/0126733 | A1* | 6/2007 | Yang | G06T 13/40 |
| | | | | 345/419 |
| 2014/0160122 | A1* | 6/2014 | Chou | G06T 13/40 |
| | | | | 345/420 |
| 2016/0027200 | A1* | 1/2016 | Corazza | G06T 15/04 |
| | | | | 345/420 |
| 2016/0267699 | A1* | 9/2016 | Borke | G06F 3/017 |
| 2018/0220935 | A1* | 8/2018 | Tadano | A61B 5/11 |
| 2020/0222757 | A1* | 7/2020 | Yang | G06V 40/23 |
| 2021/0059340 | A1* | 3/2021 | Glasgow | A41H 1/02 |

* cited by examiner

PERSONALIZED AVATAR FOR MOVEMENT ANALYSIS AND COACHING

BACKGROUND

An avatar is a representation of an entity that is employed for the entity in an environment other than the normal environment of the entity. For example, an avatar in a computing environment may be a graphical representation of a subject or of an alter ego of the subject. The graphical representation may include or be based on a mathematical model such as a polygon mesh, which is a collection of vertices, edges, and polygonal faces that defines a 3D (or polyhedral) shape of the avatar, and the polygon mesh of an avatar may be used to render views of the avatar, e.g., to provide an image or a video displaying the avatar in the computing environment.

One use of avatars is for movement analysis and coaching systems. For such purposes, the avatar generally needs to be similar to the subject whose movements may be analyzed or coached. In particular, a human-shaped avatar may need to have the proportions of the subject for accurate display or analysis of the subject's motion. A subject may also feel more comfortable if the avatar is recognizably like the subject. Constructing a sufficiently accurate avatar may be a complex and intrusive process requiring many measurements of the subject's body.

Another concern for avatars used in movement analysis and coaching is that the avatar needs to be able to move, i.e., change over time, in a manner providing a visual correspondence with the subject's movements. Movements may change the polygon mesh of the avatar. For example, movement of the leg of an avatar may require changes in the shapes of some polygons, e.g., polygons associated with joints such as a hip, knee, or ankle. Some polygons, whether or not they change shape, change locations or orientations, e.g., polygons corresponding to shins, calves, and thigh change locations when a leg of the avatar moves. Changing an avatar in a manner that matches the physics and physiology of a subject's movement can be complex, particularly because the avatar movement should not generate visual artifacts that appear unnatural or distracting.

Yet another concern for avatars is the computational difficulty in rendering images or videos based on 3D models such as polygon meshes. A computer program for rendering or image synthesis may generate an image or a frame of video from a scene file containing the polygon mesh of the avatar and data or models for background, items, or other avatars. The rendering of a frame of video needs to determine which polygons of each polygon mesh are visible from the view point of the frame, and the rendering process needs to construct portions of the image based on the appearance that visible polygons would have from the view point. In the general case, rendering an image or video frame may depend on geometry, texture, lighting, and shading data from the scene file and the view point or camera perspective for that frame. A large number of calculations may be required, so that rendering is often time consuming or requires a large amount of processing power.

Rendered images used for motion analysis and many other applications may further need (or benefit from) an overlay of text or numeric data that describes or quantifies aspects of the rendered images. Ideally, overlaid information should not interfere with other content of an image. Movement complicates the overlay process because overlay information may need to be moved to different positions in different frames of a video to prevent the overlaid information from interfering with display of the avatar or other important features of a scene. Overlay information in a video therefore may be required to jump about in an unpredictable or distracting manner.

Methods and systems are needed to provide avatars that are easy to construct and personalize, that are able to accurately portray a subject's motion, and that can be efficiently used and rendered with or without overlaid information.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

An avatar of a subject can provide a three-dimensional visual representation of motion capture data, such as data obtained from a smart suit that the subject wears during a performance of an activity. The avatar display may be useful during endeavors such as sports coaching, physical rehabilitation, exercise, dance, or training in a school, a workplace, the military, or other environments. The subject or an expert such as an instructor, trainer, coach, physical therapist, or researcher may employ the avatar display when analyzing the subject's movement, providing feedback or instruction, doing research, or any other endeavor where an enhanced display of movement information is useful.

Figure 1:
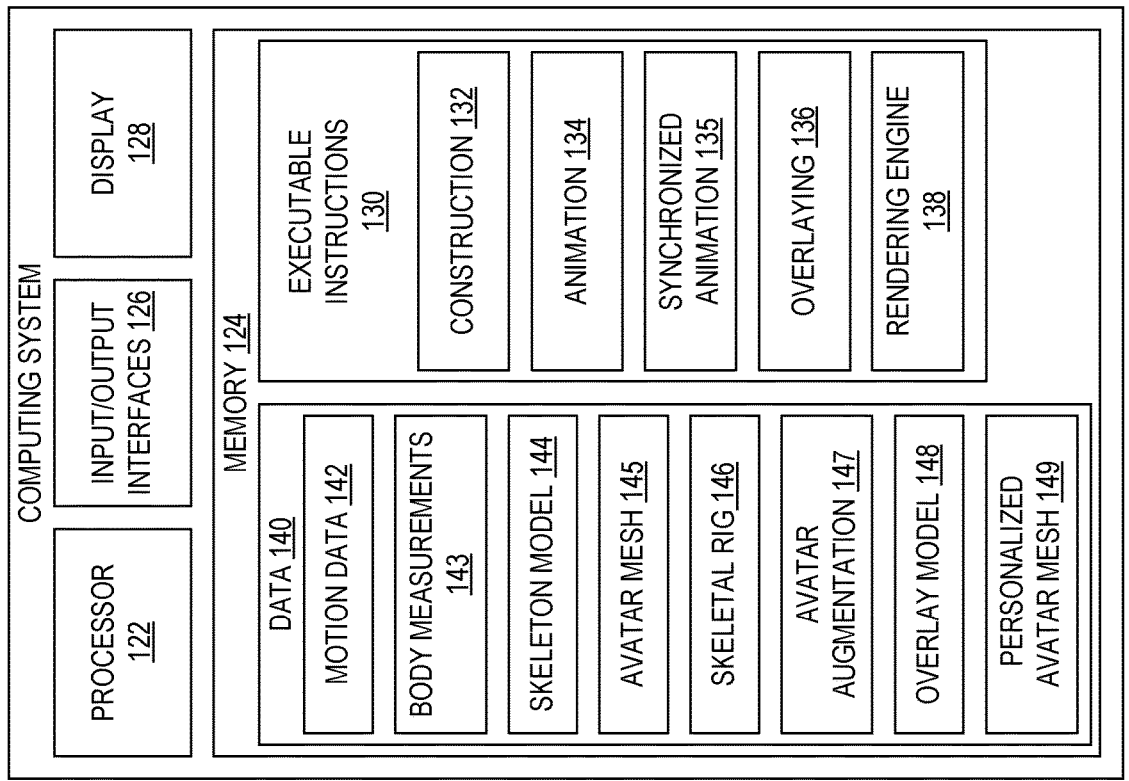
FIG. 1 is a block diagram of an example implementation of a movement analysis and coaching system.
Figure 1:
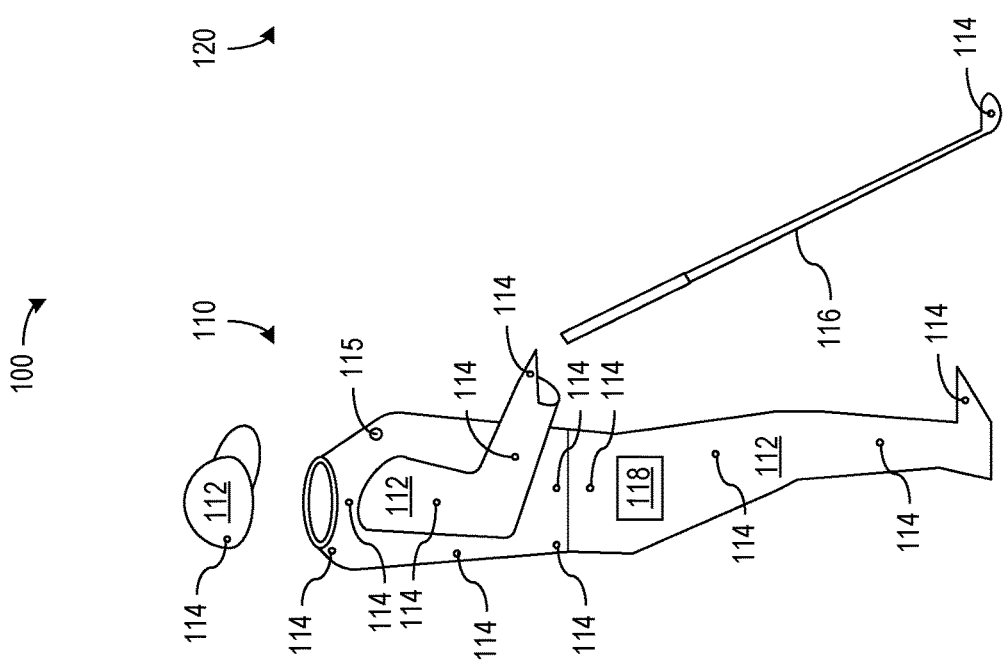

FIG. 1 is a block diagram schematically illustrating one implementation of a movement analysis system 100. Movement analysis system 100 includes a motion sensing system 110 and a computing system 120.

Motion sensing system 110 may be any system for measuring movements of a subject. For example, motion sensing system 110 may be a system, such as commonly employed in the movie industry, using a camera (e.g., a stereoscopic camera) to capture images of the subject during an activity. The subject may wear a special garment with identifiable markers, and an object recognition process can identify movements of the markers or other features in captured images to measure subject movement during the activity. Many other types of motion sensing systems 110 could alternatively be employed.

In the illustrated implementation, motion sensing system 110 includes a garment or clothing 112 with motion tracking sensors 114 that directly measure movements of a subject wearing garment 112 during an activity to be analyzed. Garment 110 may be one piece or may include multiple sections, e.g., an upper body section or shirt, a lower body section or pants, and a cap or hood. Motion tracking sensors 114 are located in or on garment 112 to sense or measure movement of specific body parts. In particular, sensors 114 may be adjacent to specific bone groups, each bone group including one or more anatomical bone, to measure the relative positions, orientations, or configurations of the specific bone groups. Garment 112 may be elastic and relatively tight fitting to minimize shifting of sensors 114 relative to the measured bone groups.

Sensing system 110 may further include one or more biofeedback sensors 115 that measure physiological functions or attributes of the subject such as the subject's heart rate, respiration, blood pressure, or body temperature. Sensors 115 may also provide more data for generation of metrics that can be displayed alongside an avatar mesh presentation. For example, a pressure insole in the subject's shoe can measure the timing and amount of weight transfer from one foot to another or between the ball and toe of the subject's foot during an activity.

Equipment 116 that the subject employs during a measured activity may be incorporated into or measured by motion sensing system 110. Equipment 116 may, for example, be sporting equipment such as a golf club, a tennis or badminton racket, a hockey stick, a baseball or cricket bat, a ball, a puck, or a shuttle that the subject uses during a measured sports activity. Equipment 116 may alternatively be a tool, exercise equipment, a crutch, a prosthetic, or any item that a subject is being trained to use. One or more moment sensors 114 may be attached to equipment 116 to measure the position, orientation, or movement of equipment 116.

A pod 118, which may be attached to or carried in garment 112, may have wired or wireless connections to sensors 114 and 115 and may operate to supply power to sensors 114 and 115 or to collect measured motion data from sensors 114 and 115. For each measured or captured movement, sensors 114 or pod 118 may produce two types of motion data: measurements sometimes referred to as sparse skeleton data, which represents relative positions and orientation of bones at specific times; and a set of measurements, sometimes referred to as metrics, calculated at set points during a performance or calculated across the whole of the performance. Pod 118 may act to store measurements, perform initial processing of measurements, or transmit motion data to computing system 120 via a wireless connection protocol, e.g., blue tooth or Wi-Fi. Alternatively, pod 118 may physically connected to computing system 120 during or after a measured activity and may download motion data 142 to computing system 120 while pod 118 is physically connected to computing system 120.

Computing system 120 may be a localized or distributed computing system and may particularly include one or more specialized or general purpose computers configured or programmed to process motion data 142 and display an avatar illustrating a subject's movements. For example, in an implementation of computing system 120 as a general purpose computer, computing system 120 may be a smart phone, a tablet computer, a laptop computer, or a desktop computer with any number of peripheral devices. Computing system 120 generally includes a processor 122, e.g., a microprocessor chip, connected to, e.g., on a motherboard with, memory 124. Memory 124 may include volatile or non-volatile storage storing executable instructions 130 and data 140.

Computing system 120 further includes input/output interfaces 126 for input or output of data and input or output of user commands, instructions, settings, and other information. I/O interfaces 126 may particularly include a data interface, e.g., a Wi-Fi, Bluetooth, or USB interface, capable of communicating with motion sensing system 110 and uploading or receiving motion data 142 from motion sensing system 110. I/O interfaces 126 may further include one or more devices such as a mouse, a keyboard, a microphone, or a touch screen allowing a user to input information such as commands, instructions, or data, e.g., body measurements, to computing system 120. A display 128 provides visual output, e.g., 2D, 3D, or stereoscopic images or video.

Executable instructions 130 include machine readable structures such as programs, subroutines, or modules that system 120 employs to perform specific technical processes disclosed further herein. For example, during construction of a personalized avatar mesh 149, an avatar construction module 132 may use information such as a skeleton model 144 that defines the kinematics of avatar movement, a subject's body measurements 143 indicating dimensions of bones in skeleton model 144, and a skeletal rig 146 that logically connects skeleton model 144 and an avatar mesh 149 and permits scaling of avatar mesh 145 to match the subject. Construction module 132 may further use avatar augmentation data 147 to add a representation of equipment 116 or accessories to personalized avatar mesh 149.

An animation module 134 can use motion data 142 to determine the configuration or movement of a subject's personal avatar mesh 149. A rendering module 138 can then use personalized avatar mesh 149 to render images (or frames in a video), which may be shown on display 128.

An overlay module 136 may add text or numeric information, e.g., measurements derived from motion data 142, to a rendered video or to a scene file, which is subsequently rendered. As described further below, overlay module 136 may analyze multiple frames of an animation to identify suitable locations for overlaid information and may employ a 3D overlay model 148 to position displayed information at appropriate locations in a video.

A synchronized animation module 135 may animate a comparison avatar for comparison with the animation of the subject avatar and may synchronize the movements of the two avatars at one or more time points. The comparison avatar may, for example, represent an expert or ideal performance of the subject's activity (or may represent a prior performance of the same activity by the subject), and the comparison avatar may be positioned adjacent to the subject avatar or may be semi-transparently overlaid or superimposed on the subject avatar so that the subject's performance can be visually compared to expert or ideal performance or to the subject's prior performance.

Figure 2:
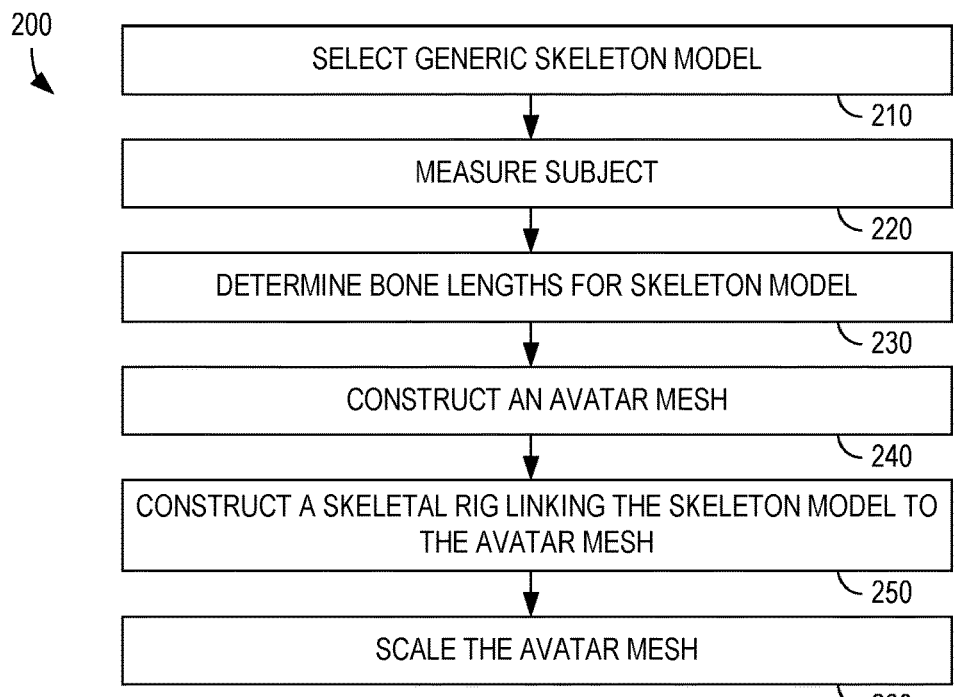
FIG. 2 is a flow diagram of a process for constructing a personalized avatar for a movement analysis and coaching system.

FIG. 2 is a flow diagram of a process 200 for constructing a personalized avatar for a subject. An avatar as disclosed herein may employ a skeleton model that models the kinematics of human motion, and an initial process block 210 in avatar construction selects a generic skeleton model. The skeletal model may logically correspond to a tree structure including nodes, sometime referred to herein as joints, and line segments, sometimes referred to as bones, interconnecting or connected to the nodes. The nodes form a hierarchy with a highest node in the hierarchy being referred to as the root node. For other nodes, the nodes closer to the root node are higher in the hierarchy that are nodes further from the root node. Nodes connected to a node higher in the hierarchy are descendant nodes of the node higher in the hierarchy. When comparing two nodes that are directly connected to each other, the node higher up the hierarchy is referred to as a parent node, and the node lower in the hierarchy is referred to as a child node. Transformations (i.e., translations, rotations or scaling) of the root node control a position and orientation of the skeleton model in a three-dimensional scene. Transformations of any other node in the hierarchy are relative to that node's parent. In particular, all of the descendant nodes from the root node of the skeleton model form an articulated chain, where the coordinate frame of a child node is always relative to the coordinate frame of its parent node.

The joint data for a skeleton model can have many different formats, and the specific format used when joint data is loaded into a rendering engine is engine specific. Rendering engines generally allow application of translations, rotations and scaling to each joint independently. In accordance with one implementation, whenever joint data or motion data needs to be stored for later retrieval or prepared for transmission (e.g., to the cloud or between devices) then, for efficiency, only a translation (e.g., a vector) and a rotation (e.g., a quaternion) for each joint is needed under an assumption that a skeleton model, without any user measurements applied, has a uniform scaling of one applied to every bone.

Figure 3:
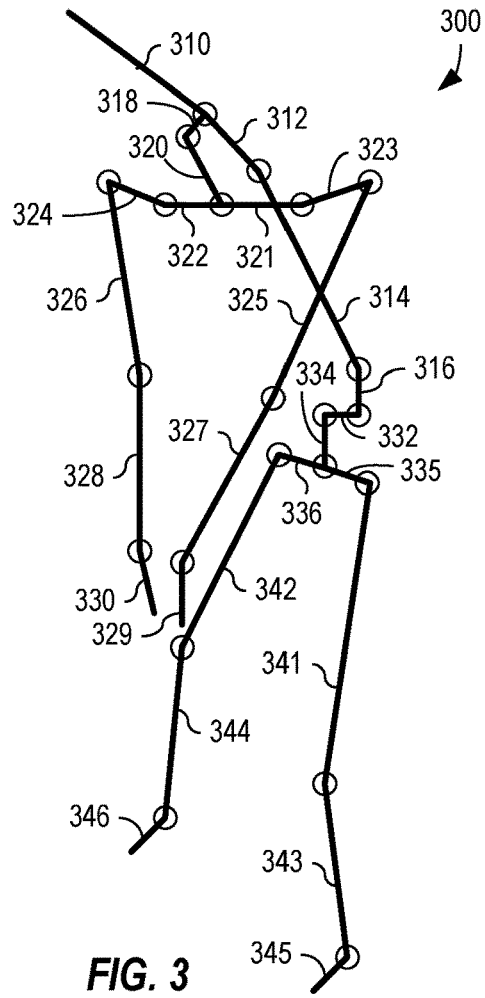
FIG. 3 illustrates an example implementation of a skeleton model of an avatar for a movement analysis and coaching system.

Each line segment connected to one or more nodes in a generic, human skeleton model may represent a bone or a fixed bone group in a human body, and each joint node may represent a possible relative movement of connected bones. FIG. 3 illustrates an example of skeleton model 300, and Table 1 shows the correspondence of the twenty-bones in skeleton model 300 to actual human anatomy. Each bone in skeleton model 300 is logically linked through a joint node to at least one neighboring bone. To pose or move of skeleton model 300, each bone can be given a three-dimensional transformation, which may change the bone's position, scale and orientation, from a default pose, and the transformations define variable orientations of the bones relative to the linked bones. A configuration of, e.g., joint data or motion data for, skeleton model 300 can define the transformations of all bones in skeleton model 300 and thereby represent a pose of a subject. In order to simplify calculations when the motion sensing system captures the user's motion, some bone groups (e.g., groups [312, 318], [320, 322, 321] and [316, 332, 334, 335, 336] in FIG. 3) may be fused at 90 degrees to each other.

TABLE 1

SKELETON MODEL

| Ref. No. | Bone Name | Corresponding Human Anatomy |
| --- | --- | --- |
| 310 | Head | C7 Vertebrae to Mid Skull |
| 312 | spineUpper | C7 Vertebrae to T10 Vertebrae |
| 314 | spineMid | T10 Vertebrae to L3 Vertebrae |
| 316 | spineLower | L3 Vertebrae to Sacrum |
| 318 | collarForward | C7 Vertebrae to Jugular Notch |
| 320 | collarDown | Jugular Notch to Mid Shoulders |
| 321, 322 | halfSternumL, halfSternumR | Mid Shoulders to (Left, Right) of Sternum |
| 323, 324 | clavicleL, clavicleR | Sternum to Shoulder Joint Center |
| 325, 326 | upperArmL, upperArmR | Shoulder Joint Center to Elbow Joint Center |
| 327, 328 | lowerArmL, lowerArmR | Elbow Joint Center to Wrist Joint Center |
| 329, 330 | halfHandL, halfHandR | Wrist Joint Center to Metacarpophalangeal Joint 3 |
| 332 | pelvisForward | Sacrum to Above Hips |
| 334 | pelvisDown | Above Hips to Mid-Hip Joint centers |
| 335, 336 | halfHipL, halfHipR | Mid-Hip Joint Centers to (Left, Right) Hip Joint Center |
| 341, 342 | femurL, femurR | Hip Joint Center to Knee Joint Center |
| 343, 344 | shankL, shankR | Knee Joint Center to Ankle Joint Center |
| 345, 346 | footL, footR | Ankle Joint Center to Metatarsophalangeal Joint 3 |

The set of bones and linking of bones in skeleton model 300 may be universal (or nearly universal) for humans, but individual subjects generally have bones that differ in sizes and proportions from those of other people. In avatar construction process 200 of FIG. 2, a process block 220 measures a subject so that a process block 230 can customize skeleton model 300 for the subject, particularly so that process block 230 can set the length of each bone in skeleton model 300 for the subject.

Multiple alternative processes 220 and 230 can be used to measure a subject and customize the skeleton model. For example, each anatomical part of the subject corresponding to a bone in skeleton model 300 may be measured with a ruler or tape measure, and then each bone length be set to the corresponding measurement. Taking a large number (twenty-six for skeleton model 300) of measurements of a subject's body may, however, be a cumbersome and intrusive process. Measurements for all bones in model 300 might alternatively be determined using image processing techniques. For example, one or more images of the subject may be captured, and a recognition program may analyze the images to identify the relevant anatomical parts and to determine relative or absolute lengths of the identified parts. Determining body measurements using image processing may be less intrusive than physically measuring a subject, but such image processing may be complex, expensive, and slow. In accordance with one aspect disclosed herein, a few strategic measurements of a subject's body may be may provide sufficient information to suitably customize a skeleton model to a subject.

Process block 220 may, for example, measure only three proportions of the subject, and process block 230 may use the three measurements to quickly estimate the lengths of the bones in skeleton model 300 for creation of a reasonably accurate personalized avatar for the subject. Table 2 illustrates one implementation for process block 230 to determine and set the lengths of bones in a personalized skeleton model from only three measurements. Table 2 is expressed in terms of three measurements stature, shoulderWidth, and armLength, and a derived quantity curvedSpineLength. The measurements of the subject may be taken using a measuring tape or a segmometer. Measurement stature may be determined by measuring the subject's height when the subject is standing flat footed with back and head against a wall or other straight vertical surface. Measurement shoulderWidth may be determined by measuring the distance between the center of rotation of the left and right shoulder joints of the subject. Measurement armLength may be determined by measuring the distance from the shoulder joint center to the wrist joint center of the subject. Derived quantity curvedSpineLength can be determined by applying measurements stature, shoulderWidth, and armLength in Equations 1.

$$curvedSpineLength = spineHeight*(1.0/(spineLwrFrac+SQRT(spineMidFrac^2+spineUprFrac^2-2*spineMidFrac*spineUprFrac*cos(spineAngle))))$$

where $$spineHeight = (k17*stature - k18)$$

$$spineLwrFrac = k19$$

$$spineMidFrac = k20$$

$$spineUprFrac = k21$$

$$spineAngle = k22$$

Equations 1:

TABLE 2

BONE LENGTHS BASED ON THREE MEASUREMENTS

| Ref. No. | Bone Name | Length (m) |
|---|---|---|
| 310 | Head | head = k1 |
| 312 | spineUpper | spineUpper = (curvedSpineLength * k2) |
| 314 | spineMid | spineMid = (curvedSpineLength * k3) |
| 316 | spineLower | spineLower = (curvedSpineLength * k4) |
| 318 | collarForward | collarForward = k5 |
| 320 | collarDown | collarDown = k6 |
| 321, 322 | halfSternumL, halfSternumR | halfSternum = k7 |
| 323, 324 | clavicleL, clavicleR | clavicle = (shouderWidth/2)-halfSternum |
| 325, 326 | upperArmL, upperArmR | upperArm = k8 * armLength |
| 327, 328 | lowerArmL, lowerArmR | lowerArm = k9 * armLength |
| 329, 330 | halfHandL, halfHandR | halfHand = k10 * armLength |
| 332 | pelvisForward | pelvisForward = k11 |
| 334 | pelvisDown | pelvisDown = k12 |
| 335, 336 | halfHipL, halfHipR | halfHip = k13 |
| 341, 342 | femurL, femurR | femur = (k14 * stature) |
| 343, 344 | shankL, shankR | shank = (k15 * stature) |
| 345, 346 | footL, footR | foot = k16 |

Equations 1 and Table 2 illustrate an example in which bone lengths are defined in terms of constants k1 to k22. Constants k1 to k22 may be different for different body types. For example, a subject's body type may be classified, for example, as adult male frame, adult female frame, or child frame to list a few possible options. Values for constants k1 to k22 specific to a specified body type may be determined by statistical analysis of measurements of people having the specified body type and/or from anatomical studies or other available publications. Table 2A gives values for constants k1 to k22 for a specific example of an "adult male body type." Similar sets of values for constants k1 to k22 may be chosen for other body types.

TABLE 2A

CONSTANT VALUES FOR ADULT MALE FRAME

| Constant | Chosen Value |
|---|---|
| k1 | 0.2200 m |
| k2 | 0.5256 |
| k3 | 0.3200 |
| k4 | 0.1390 |
| k5 | 0.0340 m |
| k6 | 0.0880 m |
| k7 | 0.0200 m |
| k8 | 0.5234 |
| k9 | 0.4766 |
| k10 | 0.1929 |
| k11 | 0.0230 m |
| k12 | 0.0760 m |
| k13 | 0.0880 m |
| k14 | 0.2400 |
| k15 | 0.2320 |
| k16 | 0.1400 m |
| k17 | 0.2905 |
| k18 | 0.0028 m |
| k19 | 0.1390 |
| k20 | 0.4810 |
| k21 | 0.3800 |
| k22 | 150° |

Table 2 gives an example in which some bone lengths are set to fixed values, e.g., average or mean values found for a relevant group of people. In particular, length foot of the subject's left or right foot, length halfHip from a subject's mid-hip joint centers to left or right hip joint center, length pelvisDown from above the subject's hips to mid-hip joint centers, length pelvisForward from the subject's sacrum to above the hips, length halfSternum from the subject's mid shoulders to left or right side of the sternum, length collarDown from above the subject's hips to mid-hip joint center, length collarForward from the subject's C7 vertebrae to jugular notch, and length head from a subject's C7 vertebrae to mid skull are set to fixed values in Table 2. Other bone lengths are proportional to one of measurements stature, shoulderWidth, and armLength, and the proportionality constants may be determined based on averages or mean values measured for a relevant group of people. In particular, length shank of the subject's knee joint center to ankle joint center and length femur from the subject's hip joint center to knee joint center are proportional to measurement stature. Lengths upperArm, lowerArm, and halfHand are proportional to measurement armLength. Yet other bone lengths may have other functional relationships to one or more of measurements stature, shoulderWidth, and armLength. For example, length spineUpper, spineMid, and spineLower as shown in Table 2 are proportional to derived value curvedSpineLength, which is a function of stature as shown in Equations 1.

The specific fixed values, proportionality constants, and functional formulations of bone lengths give in Table 2 are one example that provides good results for a wide range of people and may be experimentally validated or altered through measurements of a specific human population. Other similar processes 230 for determining bone lengths can use other fixed values, proportionality constants, and functional formulations. In case illustrated by Table 2, the personalized skeleton model for a subject may be a function of only three measurements stature, shoulderWidth, and armLength, possibly with auxiliary information or one or more user setting such as a body type choice (or as described below a shoe size).

Additional body measurements, e.g., more than three, may alternatively be used to determine the bone lengths for a skeleton model such as skeleton model 300 of FIG. 3. For example, process block 220 can include determining eight body measurements, so that process block 230 may provide a more accurate estimate or determination of the lengths of the bones for a subject's personalized skeleton model. The eight measurements taken may include a spine length spineLength, a shoulder width shoulderWidth, an upper arm length upperArmLength, a forearm length foreArmLenth, a hand length handLength, an inter-anterior superior iliac spine width interAsisWidth, a thigh length thighLength, a shank length shankLength. Measurement stature may be determined by measuring the subject's height when the subject is standing flat footed. Measurement spineLength may be determined by measuring the distance between the sacrum to cervical vertebrae No. 7 of the subject. Measurement upperArmLength may be determined by measuring the distance from the shoulder joint center to the elbow joint center of the subject. Measurement foreArmLength may be determined by measuring the distance from the elbow joint center to wrist joint center of the subject. Measurement handLength may be determined by measuring the distance between the wrist joint center to the metacarpophalangeal joint of the middle finger of the subject. Measurement interAsisWidth may be determined by measuring the distance between the left and right anterior superior iliac spine projections of the subject. Measurement thighLength may be determined by measuring the distance between the hip center of rotation to the knee joint center of the subject. Measurement shankLength may be determined by measuring the distance between the knee joint center to the lateral malleolus of the subject. From these eight measurements, process block 230 can determine the lengths of the bones in a personalized version of skeleton model 300 as shown in Table 3.

TABLE 3

BONE LENGTHS BASED ON EIGHT MEASUREMENTS

| Ref. No. | Bone Name | Length (m) |
| --- | --- | --- |
| 310 | Head | head = k1 |
| 312 | SpineUpper | spineUpper = spineLength * k2 |
| 314 | SpineMid | spineMid = spineLength * k3 |
| 316 | SpineLower | spineLower = spineLength * k4 |
| 318 | CollarForward | collarForward = k23 |
| 320 | CollarDown | collarDown = k24 |
| 321, 322 | halfSternumL, halfSternumR | halfSternum = k7 |
| 323, 324 | clavicleL, clavicleR | clavicle = (shoulderWidth/2)-halfSternum |
| 325, 326 | upperArmL, upperArmR | upperArm = upperArmLength |
| 327, 328 | lowerArmL, lowerArmR | lowerArm = foreArmLength |
| 329, 330 | halfHandL, halfHandR | halfHand = handLength |
| 332 | PelvisForward | pelvisForward = k25 |
| 334 | PelvisDown | pelvisDown = k12 |
| 335, 336 | halfHipL, halfHipR | halfHip = (interAsisWidth * k26)/2.0 |
| 341, 342 | femurL, femurR | femur = thighLength |
| 343, 344 | shankL, shankR | shank = shankLength |
| 345, 346 | footL, footR | foot = k16 |

Table 3 illustrates an example in which bone lengths are defined in terms of some of the constants k1 to k22 given in Table 2A and additional or alternative constant k23 to k26. Similarly to the example of Table 2, constants k1 to k26 in the example of Table 3 may have different values for different body types, e.g., adult male frame, adult female frame, or child frame to list a few possible options. Table 3A gives values for constants k23 to k26, which are not given above in Table 2A.

TABLE 3A

ADDITIONAL CONSTANT VALUES FOR ADULT MALE FRAME

| Constant | Value |
| --- | --- |
| k23 | 0.0340 |
| k24 | 0.0800 |
| k25 | 0.0270 |
| k26 | 0.8600 |

The lengths of the bones in the personalized version of skeleton model 300 of FIG. 3 determined according to Tables 3, 2A, and 3A include some bone lengths (i.e., head, collarForward, collarDown, halfSternum, pelvisForward, pelvisDown, and foot) that are fixed and independent of the body measurements, some bone lengths (i.e., upperArm, lowerArm, halfHand, femur, and shank) that are directly measured, some bone lengths (i.e., spineUpper, spineMid, spineLower, and halfHip) that are proportional to an associated body measurement, and a bone length (i.e., clavicle) that is determined using a function of the body measurements. As noted above with reference to the three-measurement skeleton model customization process, the fixed lengths, the proportionality constants, and the functional relationships relating the eight measurements to the twenty-six bone lengths for skeleton model 300 may be determined through a statistical comparison with a relevant population of people.

The examples of the three-measurement and eight-measurement implementations of the bone length determinations in process block 230 of FIG. 2 may be augmented through use of additional information. For example, both the three-measurement and eight-measurement implementations employ a fixed bone length FootL or FootR for the subject's feet. As described above, FootL or FootR, which corresponds to the distance between the subject's ankle joint center and metatarsophalangeal joint 3, is set at a constant value k16, e.g., for a adult male frame, 0.1400 m, which corresponds to a UK 9.5 shoe size. Alternatively, values for the ankle joint center to metatarsophalangeal joint 3 distance corresponding to different shoe sizes are known, for example, in the shoe industry, and bone lengths FootL and FootR may be set or scaled according to a subject's shoe size, rather than an average size. More generally, the three-measurement and eight-measurement implementations of the bone length determinations in process block 230 of FIG. 2 may be augmented through use of one or more additional measurements or use of additional information such as a shoe size or other clothing size parameters that the subject is likely to know and that may not require measurement during process 200.

Process 200 of FIG. 2, after determining bone lengths for the personalized version of the skeleton model, includes a process block 240 for constructing an avatar mesh, i.e., a polygon mesh for the avatar. An avatar mesh may be constructed in a variety of ways. For a close resemblance or the avatar to a subject, process block 240 may include an artist with a suitable modeling package (such as Maya or 3DS Max) manually creating the avatar mesh for the subject. An alternative implementation of process block 240 that also provides an avatar mesh with a close resemblance to the subject may generate an avatar mesh from a full body scan or stereoscopic image of the subject. In the case where an avatar mesh is generated from a full body scan, process block 230 can determine the bone lengths in the skeleton model for that subject at the same time. For more efficient construction of an avatar, an implementation of construction process block 240 may include selecting an avatar mesh for the subject from a set including one or more generic avatar meshes. For example, a single "human" avatar mesh may be employed for all subjects, or process block 240 may select the avatar mesh from among a few "body type" avatar meshes, e.g., man, woman, and child avatar meshes.

Process block 240 may customize the avatar mesh in various ways to allow subjects to make avatars look more like themselves. The customization can include adding or removing accessory meshes at specific locations on the avatar mesh. The accessory mesh items may represent objects or aspects of the subject such as corrective glasses, hair styles, and different types of clothing. The customization may further include changing the overall color of the polygons in an accessory mesh using a color selection control. The customization may further include changing the texture used on the polygonal mesh, either from a predefined selection or from an image the subject supplies. This allows the user to change aspects such as the material of an accessory, add sponsorship logos to clothing or allow placing the image of the subject over the face of the avatar.

Customization performed by avatar construction process block 240 may add additional primary bones to primary mesh binding structure or the skeleton model in order to allow the addition of one or more active dynamic accessories such as a golf club or a tennis racket. Once the purpose of the accessories is known, the behavior of the accessory can be modeled and added to avatar augmentation data, e.g., such as avatar augmentation data 147 in system 100 of FIG. 1. The new primary bones are added to the skeleton model and as such, are additional bones added to the skeletal rig, which is described further below. Further, when the avatar mesh is being presented with accessories, an appropriate mesh can be modeled and programmatically attached to the new primary bones. Additional updates to the avatar scaling should not be necessary because accessories of the same type generally have the same size. A similar technique can also be used for equipment that is not directly attached to the subject although additional hardware may be required to provide motion data. For example, when the added accessory is a ball, a radar system can be used to determine the flight path of the ball.

The motion data for added accessories can be fed into or through a pod worn by the subject as described above, and the pod can provide separate motion data, e.g., sparse quaternion data, that process block 240 can use to position and orient the bones added to the skeleton model, e.g., to attach a golf club mesh or a golf ball mesh. Accessory meshes can either be modeled by hand from some suitable reference material or the actual objects can be scanned to provide an accurate visual representation. Accessory meshes may also be dynamically selected and resized by the system depending on the motion being captured. For example, different golf clubs, which may be used for different types of golf shots, may have different lengths, and a polygon mesh corresponding to a golf club may be scaled to the appropriate length. As the system is informed of the type of motion being captured system can automatically select the correct accessory and adjust the accessory size to the user's preselected preferences.

A process block 250 creates a skeletal rig linking a skeleton model and the avatar mesh. A modeling tool may be used to construct the skeletal rig, and one or more generic skeletal rig may be pre-constructed and available for process block 250 to select. The skeletal rig includes the skeleton model and may further include additional bones that connect the skeleton model and avatar mesh The skeletal rig may be mathematically the same type of entity as a skeleton model, e.g., a hierarchy of joints (node) connected by bones (line segments). The structures in the skeletal rig, however, may be logically grouped by function into three types, referred to herein as primary, secondary, and tertiary mesh binding structures. The primary mesh binding structure is a complete copy of the skeleton model, e.g., generic skeleton model 300 of FIG. 3 or a skeleton model augmented with bones for accessories. A process commonly referred to as weight painting may connect the binding structure bones to the majority of the avatar mesh. Weight painting determines how much influence the position of a particular bone has on one or more vertices in the avatar mesh. The joints in the primary mesh binding structure are directly manipulated at run time by the captured animation data, e.g., quaternion rotations, and the resulting bone movement and the linking relationships defined by weight painting causes the majority of the movement of the avatar mesh. The results are, that as the bones in the primary mesh binding structure are directly manipulated, the avatar mesh will deform and move realistically.

The secondary mesh binding structures are not directly manipulated in response to motion data but are affected by the positions or movements of one or more primary binding structures in order to reduce unwanted artifacts in the avatar mesh. For example, a secondary mesh binding structure can be added to represent an abdominal muscle and may be linked to primary binding structures corresponding to mid, lower, or upper spine. When motion data indicates motion of bones associated with the subject's mid, lower, and upper spine, the linked secondary binding structure moves and alters the portion of the avatar mesh corresponding to an abdominal muscle. Secondary mesh binding structures, more generally, may be used to reduce unwanted artifacts in the avatar mesh as the avatar mesh deforms.

The tertiary mesh binding structures are only used for the initial pose of the avatar mesh. The tertiary mesh binding structures may define fine details of the avatar mesh. For example, a tertiary mesh binding may control the pose of the hands in a fixed club grip position, so that the fixed grip position does not change as the arms of the avatar mesh move. The tertiary mesh binding structures may be promoted to secondary or primary mesh binding structures. For example, converting a tertiary mesh binding structure to a secondary mesh binding structure allows the represented portion of an avatar to move in response to bone movement if a rule for such movement can be established. A tertiary mesh binding structure may be converted to a primary mesh binding structure if motion sensing senses bones associated with the tertiary mesh binding structure.

Some implementations of process 200 employ pre-constructed avatar meshes, one of which is selected in process block 240 for the subject. Process block 250 can similarly select the skeletal rig that was pre-constructed for the selected avatar mesh. Using one avatar mesh and skeletal rig combination for all subjects (or for large groups of subjects) can greatly reduce the difficulty of constructing a completely new custom avatar for each subject.

Process block 260 scales the avatar including the skeletal rig and avatar mesh to proportions of the subject. In process block 260, the initial sizes or lengths of each of the bones from the primary mesh binding structure (a.k.a., the primary bones) within the skeletal rig may be manually set using a modeling package or set automatically when the avatar mesh and skeletal rig are first loaded for use. The sizes of the primary bones are then compared to the respective sizes of the same bones determined in process block 230 for the subject's personalized skeleton model, and scale factors are calculated for the primary bones in the skeletal rig. The scale factors are then applied to the respective primary bones in the avatar mesh skeletal rig. If a primary bone in the avatar mesh skeletal rig has any primary bone children, the primary bone children should be scaled independently from the parent bone. In particular, if the mathematical representation defining the skeletal rig inherently propagates the scaling of a bone to children of the bone, then an inverse scale may applied to the primary bone children, so that the correct scalings may be applied. Secondary or tertiary binding structures may be scaled the same as a parent bone. The scaling of the bones in the skeletal ring causes scaling or changes in the avatar mesh that depend on the weight painting linking the skeletal rig to the avatar mesh.

Figure 4:
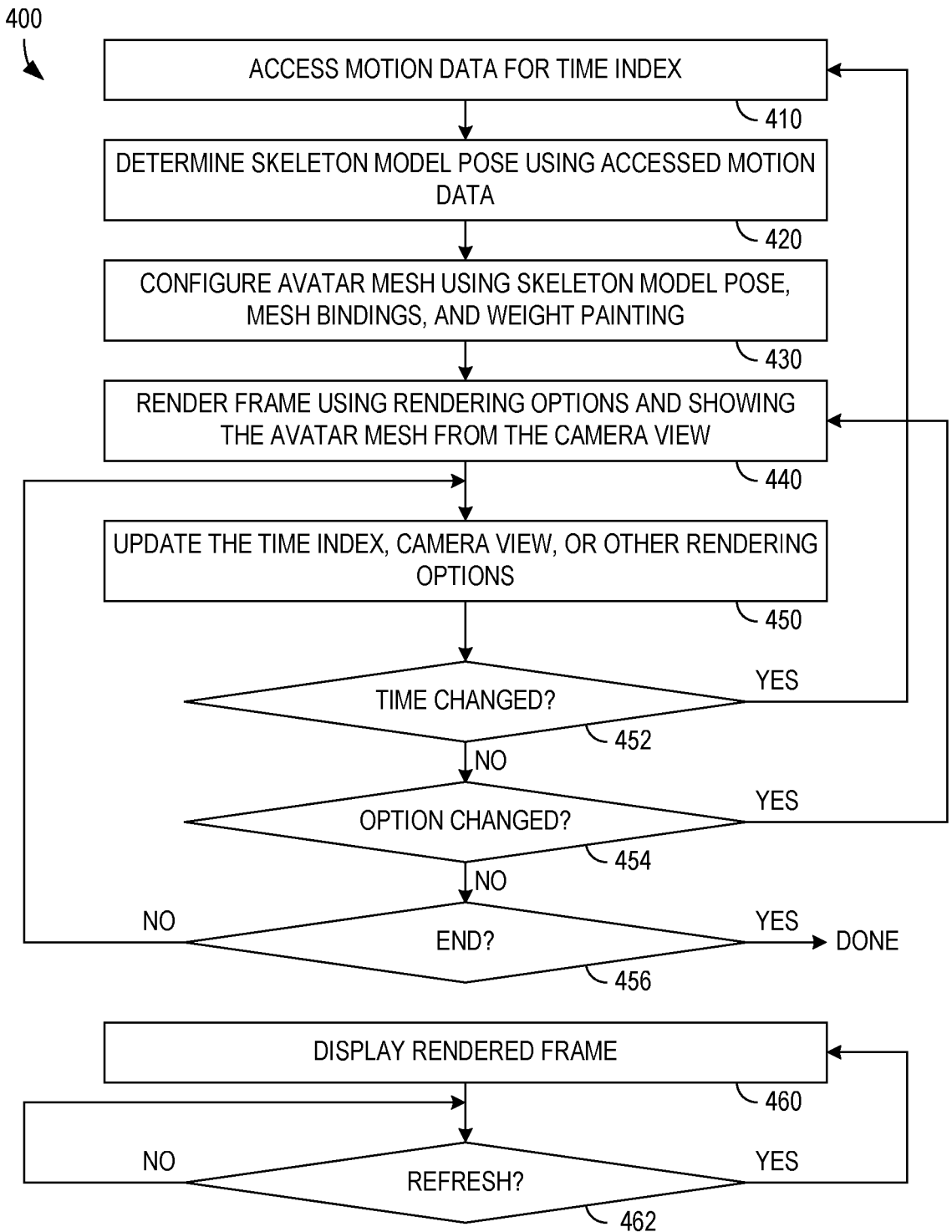
FIG. 4 is a flow diagram of a process for displaying synchronized movements of avatars.

FIG. 4 is a flow diagram illustrating an implementation of a process 400 for animating an avatar. Coaches or experts may use such avatar animations when analyzing a subject's performance and when providing feedback to the subject with specific instruction for any given movement during the animation. The animation may alternatively be used for automated feedback and instruction, for example, when artificial intelligence or evaluation software can identify problematic movement or improved techniques for an activity. The animation may, more generally, be used for generic instruction, to provide information, or for user education. Animation process 400 is driven by motion data, which may be captured from a motion sensing system as described above with reference to FIG. 1. Alternatively, motion data may be computer generated or user generated, for example, for example, when a coach employs a user interface to pose or reposition an avatar to illustrate improved technique at any time during an animated activity. In one implementation, the motion data, sometimes referred to as sparse skeleton data, includes of a series of sets of quaternions that describe the relative orientations of the bones in the skeleton model, and the sets in the series are indexed or ordered according to measurement times. Given a time, a process block 410 accesses motion data for a measurement corresponding to the given time, and a process block 420 determines the orientations of the primary bones in the skeletal rig using the motion data for the given time. A process block 430 may then determine a configuration of the avatar mesh using the structural bindings and the orientation of the primary bones at the given time, and a process block 440 renders a single frame of animation rendered using the configuration of the avatar mesh and a current camera view.

Display of animation in process 400 may be synchronous or asynchronous with generation of rendered frames. In the implementation of process 400 in FIG. 4, a process block 460 displays a current or last rendered frame, and a process block 462 determines whether to refresh the displayed frame. In general, a refresh rate may depend on a desired frame rate for display of a video or on the refresh rate capabilities of the display being used.

A user may be able to start, stop, and change the speed of animation process 400 at will and may also set the animation to specific times or time periods (known as phases) within the motion. A process block 450 updates a state of or user preference for the animation and in particular may update the time or the camera view. Process 450 may, particularly, decide how or whether to changes the time of the animation based on the user commands, e.g., increment the time if the animation is being continued and the size (or direction) of the time increment may depend on the playback speed (or direction). If the time is changed, a decision block 452 causes process 400 to branch back to process block 410 and access motion data for the new time index. If a linear series of times is selected and the resultant primary bone orientations are sequentially applied to the skeletal rig, the movement captured video may be reproduced as a single performance of the avatar mesh. Generally, bone orientations may be sampled at a fixed sampling rate, e.g., about every 16 ms, rendered frames may be generated at the same rate, and then displayed at a refresh rate, e.g., 60 fps, of the device, e.g., display 128 of FIG. 1, being used to show the animation. Matching the measurement rate and the frame rate may produce a smooth animation and a good representation of the performance of the subject. Sampling measurement data at time intervals that are shorter than the time between frames allows production of a slow-motion effect when showing the animation. For example, a sample period of 1 ms could produce animation at up to more than sixteen times slower than the natural speed of the performance. Slow motion display allows a user to see imperfections in the movement that may otherwise be missed with real time viewing. If the animation is stopped, no change in the time index is required.

The user may also be able to move a camera about the 3D scene to view an avatar mesh from any angle both while the animation is playing and when the animation is paused. If the camera view and the time index changed when updated in process block 450, process blocks 410, 420, and 430 are performed to update the configuration of the avatar mesh for the new time index before process block 440 renders a view of the new configuration of the avatar mesh from the new camera view. If the time index has not changed when process block 450 changed the camera view, the configuration of the avatar mesh does not need to be changed, and a decision block 454 causes process 400 to branch to process block 440, which renders the avatar mesh from the new camera view. A decision block 456 may branch back to update process block 450 for further user commands or may end the animation.

Process 400 is described above with particular attention to the rendering of an avatar, but more generally, a frame rendered in process block 440 may include additional content such as background, overlay information, and one or more additional avatars displayed for comparison with the subject's avatar. The background for an animation may be user chosen or automatically selected for the performance. An animation can use location information or the type of performance be animated when selecting a background scene for the animation. For example, the avatar can be placed onto a golf course or tennis court and depicting appropriate weather conditions when animating a golf or tennis performance. Alternatively, the avatar may be placed in an alternate reality, for example, for the purposes of setting scenarios, e.g., getting the subject to picture themselves at a particular place on the course or in a major tournament, or for gamification.

In a single-avatar presentation or animation, a user can study a single motion capture performance. As described above, when viewing the performance, the user may start/stop the playback of the performance animation, change the speed of the animation, set the animation frame to any specific point within the performance, e.g., a phase or time since the performance start. The user may also change the position and angle of the camera including setting the camera position to orthogonal locations or making the camera locally referenced to the avatar, e.g., providing a first person view. The user can show the whole avatar mesh or a portion of the avatar mesh (for example, an arm or leg) in order to draw attention to certain parts of the performance. The user may also select one or more metrics to be displayed while viewing the avatar. Additionally, a body part may be selected and tracked through the animation using automated zoom and camera positions to give a clear presentation of the movement in that area.

A coach or expert, when trying to improve a subject's position within a performance, commonly 'places' the subject in a position for the performance. To do this remotely or by description is difficult. With an avatar presentation the user may choose to directly manipulate the avatar mesh's skeleton rig to demonstrate a specific pose or technique or to change to a pose or technique. For example, if the coach wishes the subject to flex her knee more, the coach may select a previous trial performed by the subject and select and drag the joints or segments into the desired position at a given point in the movement animation. A user may alternatively alter the avatar (particularly the skeleton model) through setting or direct input of specific values or metrics. From the alterations, the underlying motion data or metrics may be calculated in order to create a new animation against which prior or future performances can be compared.

A movement analysis and coaching system as disclosed herein may also employ a multiple avatar presentation. In a multiple avatar presentation, two or more avatars can be placed in the same scene to allow the user to compare performances. One or more performances being compared to a current performance of a subject may be derived from a previous performance from that subject, may be a previous performance from another subject, or may result from the combination of a number of performances of one or more subjects. All of the presentation options available when displaying a single avatar mesh may be available when animating multiple avatar meshes. For example, a user may be able to select animation options such as animation speed and length, camera positioning and movement, selecting body parts displayed, and selecting metrics for display.

Figure 5:
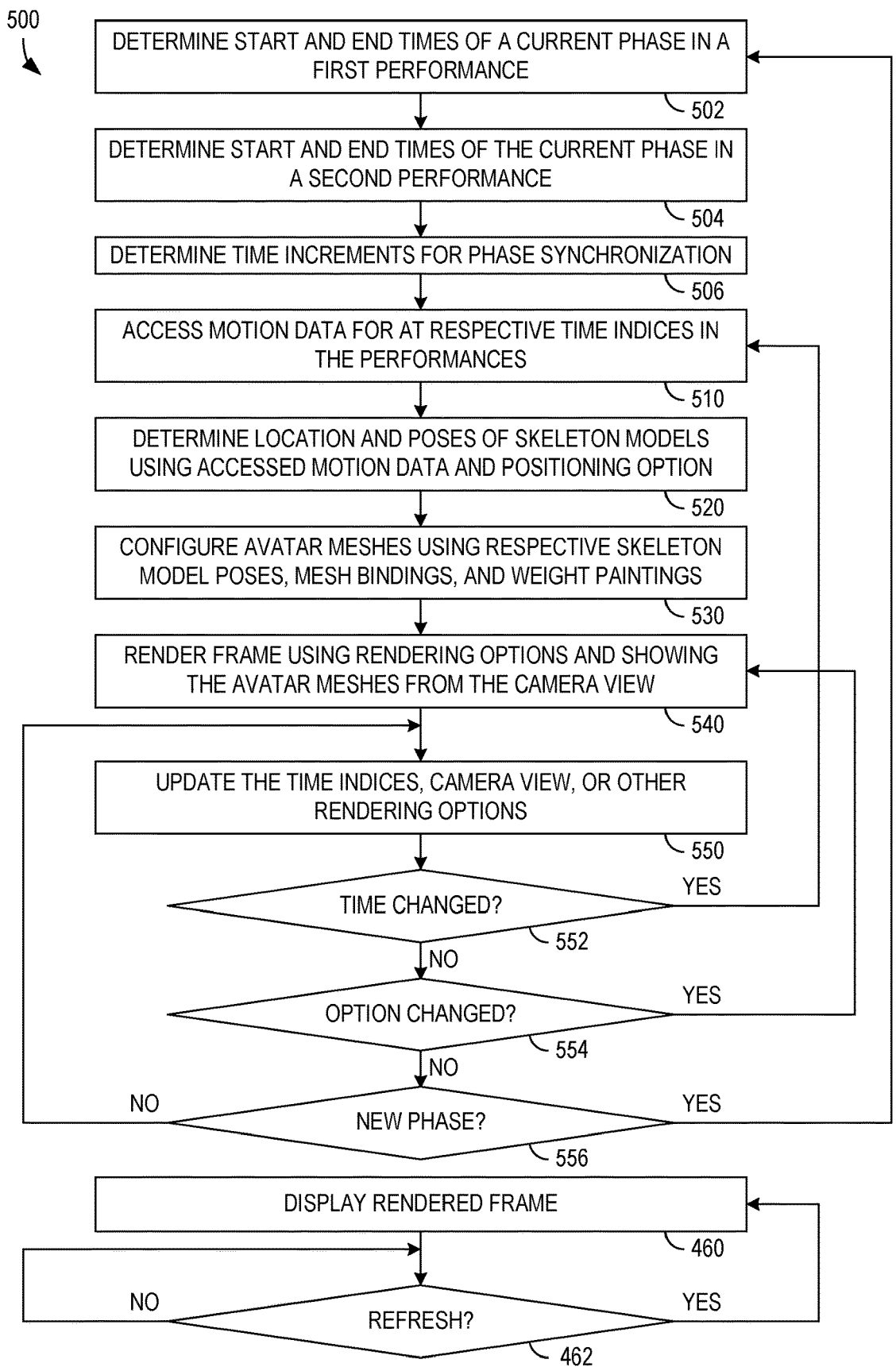
FIG. 5 is a flow diagram of a process for adding information to a display of a moving avatar.

Animating multiple avatars also allows additional display options, for example, for relative positioning of the avatars and for synchronization of avatar animations. FIG. 5 is a flow diagram illustrating one implementation of a process 500 for animating a scene including multiple avatars. (In general, any number of avatars may be simultaneously animated in the same scene, but for simplicity, the following concentrates on the example of animating two avatars, e.g., a subject avatar and a comparative avatar, at the same time.) Given two performances, e.g., given motion capture data for two performances, calculations may performed in order to spatially, temporally and/or orientationally synchronize the subject and comparative avatars during animation of the performances. In accordance with an aspect disclosed herein, separate time indices may be used for the animations of the avatars and different time increments may be used for the different avatars or a different time increments for the same avatar. In particular, motion capture data for multiple performances may be evaluated to determine the start and end times of matching phases in the performances, and the speeds for animation of the performances may be adjusted so that the starts and ends of each phase are synchronized for all of the performances.

Process 500 includes a process block 502 that analyzes motion capture data for a first performance to identify a start time and an end time for a current phase in the first performance. For golf swing, for example, process block 502 may identify a time (start time) when a backswing phase starts and a time (end time) when the backswing reaches maximum club height. A process block 504 can similarly analyze motion capture data of a second performance to identify a start time and an end time for the same phase, e.g., a backswing phase, of the second performance. In general, the durations of the same phase may differ in two different performances, and to synchronize the start and end of the current phase in animations of both performances, one of the performances may be played at a faster or slower rate during the current phase. A process block 510 accesses motion data for the avatars at their respective time indices, initially at the respective start times determined in process blocks 502 and 504. For example, the initial time indices may correspond to the beginning of a backswing when the both performances show the backswing phase of hitting of a golf ball.

A process block 520 determines the skeleton model poses and positions in the scene, and a process block 530 configures the avatar meshes using the respective skeleton model poses, mesh bindings, and weight paintings. The poses may be determined as described above based on the motion data indicating the relative positions and orientations of the primary bones in the skeletal rig. The positions of the avatars may be according to user preference. For example, two avatars may be side-by-side with an offset distance or gap between the two avatars, the avatars may be facing the same direction or facing each other. Alternatively, the comparative avatar (or the subject avatar) may on top of or superimposed on the subject avatar (or the comparative avatar), for example, when rendering will make the comparative avatar (or subject avatar) semi-transparent or translucent. The sizes of the avatars may also be scaled, e.g., so that the comparative avatar is the same height as the subject avatar. A process block 540 employs user preferences or commands when rendering the scene including the multiple avatar meshes as visible from the camera view.

A process block 550 updates the time indices as well as other user preferences or commands such as the desired camera view and rendering options and decision blocks 552, 554, and 556 determines how the next frame of animation will be created. When updating the time indices, the increments or the time periods between frames for two avatars are not required to be the same. If the time increments for both avatars are the same, two avatars animations that are synchronized at one specific time, e.g., at the beginning of a backswing or at club impact with a golf ball, may not be synchronized during other phases of the animation. If the user chose to have the start and end of the current phase of the performances to be synchronized, time increments may differ (as determined in process block 506) so that two animations are synchronized at multiple times, e.g., the start and end of a current phase or the starts and ends of all phases. For example, initial time indices may synchronize two golf swing performances to start at the beginning of a backswing. The time increments respectively used for the two avatars may at first be selected so that the backswings reach their respective maximum at the same time, e.g., the animation of one avatar may be slowed or sped up so that both animations reach maximum backswing at the same time. After the maximum backswing, the time increments may be changed so that both animations impact the ball at the same time, again potentially speeding up or slowing one avatar animation so that impacts occur at the same time. More generally, dynamically adjusting the frame period may permit synchronizing the start and end of two performances and one or more times of one or more milestone states or metrics during the performances. In process 500, decision block 556 determines whether the animation has entered a new phase, and if so, process 500 branches back to process blocks 502, 504, and 506 to determine the start and end times of the new phase and determine time increments for time scaling that synchronizes the start and end of the new phase in the animation.

Animations may further include annotations. As described above, a motion sensing system may produces multiple types of data. The sparse skeleton data is used to animate the avatar mesh as described above with reference process 400 of FIG. 4 or process 500 of FIG. 5. Additionally, direct and calculated measurements may quantify aspects of a performance at a point in time, within a time range or phase, or across the whole of the performance. Points in or portions of a performance may also be used to categorize or identify portions of the performance. The categorizing or quantifying values or information are referred to herein as metrics, and metrics can be combined into a presentation with a single avatar or with multiple avatars to simplify the analysis of performances.

Figure 6A:
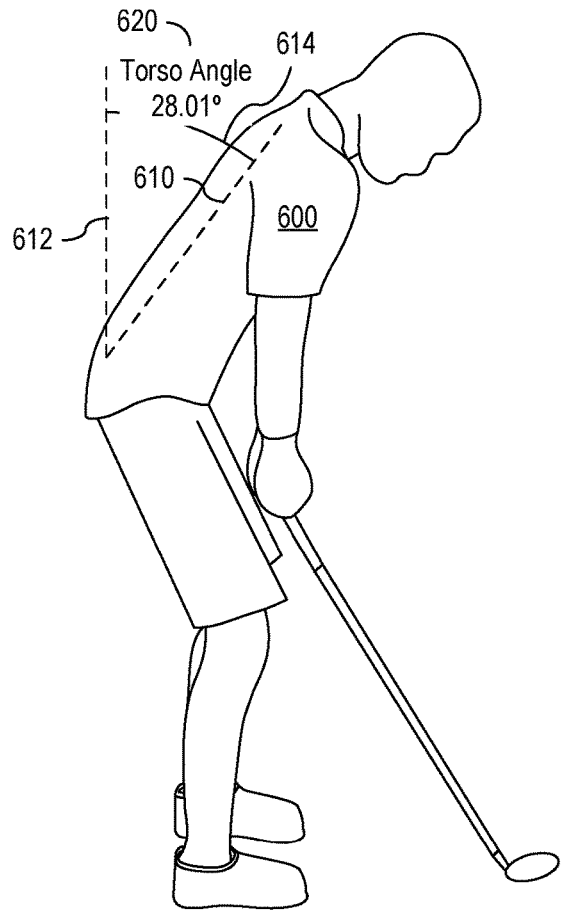
FIGS. 6A, 6B, and 6C illustrate different views of an avatar with overlay information.
Figure 6B:
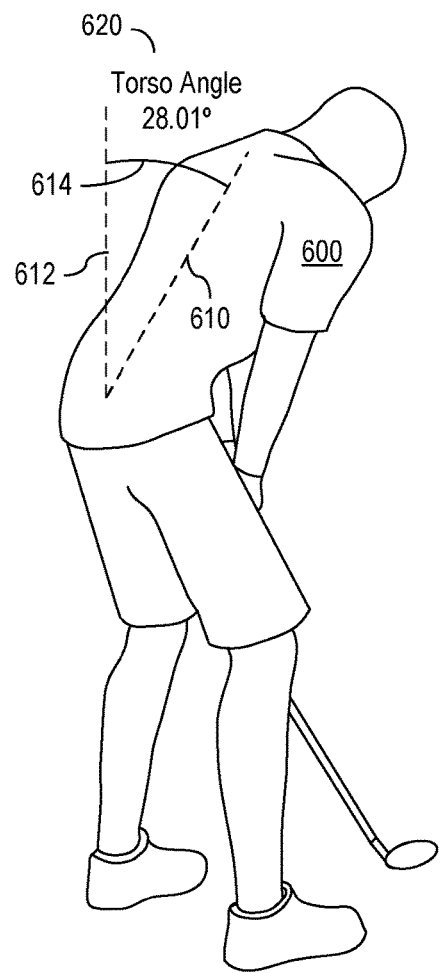
Figure 6C:
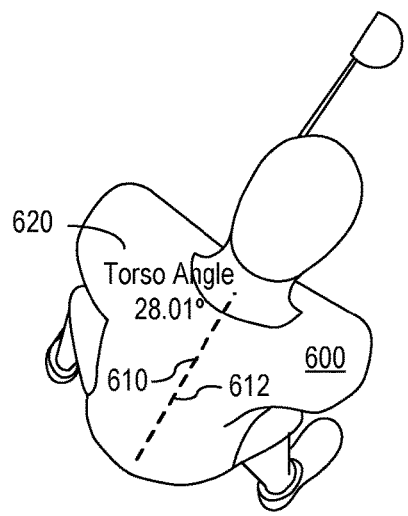

A movement analysis or coaching system may allow the user to select one or more metrics to be displayed in an avatar animation. The metrics may, for example, show angles, distances and other relevant information that may have been derived from data from the connected hardware. Both the angle measured and the comparison metric may be shown. In accordance with an aspect disclosed herein, the metric data is not simply overlaid on top of the 3D image but may be part of the 3D scene. Accordingly, as the user moves the camera about the scene the details associated with any enabled metric move as well. FIGS. 6A, 6B, and 6C, for example, show images with different camera views that contain renderings of an avatar 600 and guide structures 610, 612, and 614 and a label 620. As illustrated, the different camera views may change the rendered images significantly, and one goal of animating an avatar with metric display is to ensure that the label 620 showing metric data is readable from wherever the user places the camera. A further goal is that label 620 remains readable at all times during the animation. These goals may be achieved using 3D scene objects that when rendered produce guide structures 610, 612, and 614 and label 620 in each image. A 3D guides structure may include lines and curves used to give a visual indicator of location and magnitude of a metric and may correspond to a secondary or tertiary mesh binding structures. In FIGS. 6A, 6B, and 6C, guide 610 corresponds a first line segment 610 along the avatar's spine, a vertical line segment 612 originating from the base of the first line segment 610, and an arc 614 extending between points near the tops of the two lines. Label 620, in the illustrate example, includes the name of the metric and a value of the metric at the current point in time of the animation. 3D guide structures more generally may be constructed out of simple 3D primitives (e.g., line segments, cylinders, arcs) and may be rendered into the scene after the avatar mesh and with no regard for depth buffering to ensure the guides cannot be obscured by the avatar mesh. Labels such as label 620 may also be 3D objects that can either be constructed dynamically from polygons or dynamically generated textures that are aligned to face the camera to remain visible and upright.

The best position for labels in an animation, particularly for labels that are not specifically attached to a particular part of an avatar, may be determined by analyzing multiple animation frames from the current camera position. Both frames forward in time and backward in time from the currently viewable frame may be considered. The analysis of a frame may determine an energy function. An energy function is a function that can be used to compute the importance of a pixel within the image. A simple example of an energy function, for example, may give for each pixel a value equal a sum of the absolute difference between the pixels directly above and below the pixel and the absolute difference between the pixels directly to the left and right of the pixel. The energy function value gives an indication of the general trend of the pixel values in that area of the image, and pixels having a high energy may indicate areas of the frame considered to have important details. Pixels with a low energy may indicate areas that have no or few important detail and so would be a good place for a label. An overlay module, e.g., module 136 of FIG. 1, can support several types of energy functions such as gradient magnitude, entropy, visual saliency and more and can identify image areas having a lowest average energy in all (or at least multiple) frames in which a label will be displayed. For example, once several frames have been considered, the energy changes between frames can be compared to determine the areas of each frame with a consistently low pixel energy, and from these, the best temporal location for the label can be chosen. The low-energy location identified for label may be the same two-dimensional location in the frames or may be a three-dimensional location underlying three-dimensional scene being rendered.

Each of the modules disclosed herein may include, for example, hardware devices including electronic circuitry for implementing the functionality described herein. In addition or as an alternative, each module may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A method for creating a personalized avatar for a subject, the method comprising:
   constructing a skeleton model representing a human body, the skeleton model including a plurality of joints and a plurality of bones linked to the joints, the bones respectively corresponding to bone groups of the human body;
   weight painting a polygon mesh representation of a human so that locations of vertices in the polygon mesh are dependent on configurations of the bones of the skeleton model;
   measuring the subject, wherein measuring the subject consists of determining eight measurements including a spine length of the subject, a shoulder width of the subject, an upper arm length of the subject, a forearm length of the subject, a hand length of the subject, an inter-anterior superior iliac spine width of the subject, a thigh length of the subject, and a shank length of the subject;
   evaluating functions of the eight measurements to determine, based on the eight measurements, respective lengths for the bone groups; and
   scaling the polygon mesh by:
   scaling the skeleton model so that the bones in the skeleton model have the lengths determined for the bone groups corresponding to the bones; and
   positioning vertices in the polygon mesh according to the weight painting and the configuration of the skeleton model after scaling of the skeleton model.

2. The method of claim 1, wherein the skeleton model is a generic skeleton model that is applicable to a population including the subject.

3. The method of claim 1, further comprising selecting a generic human polygon mesh as the polygon mesh before scaling the polygon mesh.

4. The method of claim 3, wherein selecting the generic human polygon mesh comprises selecting from among a set of generic human polygon meshes including a first polygon mesh associated with a male body type and a second polygon mesh associated with a female body type.

5. The method of claim 1, wherein the skeleton model includes more than eight bones corresponding to different bone groups.

6. The method of claim 1, further comprising performing a statistical comparison with measurements of a relevant population of people to determine the functions evaluated.

7. The method of claim 1, further wherein the functions relate the eight measurements to twenty-six bone lengths for the skeleton model.

\* \* \* \* \*